(12) United States Patent
Somekh et al.

(10) Patent No.: US 12,035,001 B2
(45) Date of Patent: Jul. 9, 2024

(54) NEGATIVE SIGNAL PROBABILITY DETERMINATION AND CONTENT ITEM SELECTION

(71) Applicant: Verizon Media Inc., New York, NY (US)

(72) Inventors: Oren Shlomo Somekh, Kfar-Neter (IL); Natalia Silberstein, Haifa (IL); Yaroslav Fyodorov, Haifa (IL); Fiana Raiber, Karmiel (IL); Oleg Zendel, Victoria (AU); Ali Tabaja, Shefa-a'mr (IL)

(73) Assignee: Yahoo Assets LLC, New York, NY (US)

( * ) Notice: Subject to any disclaimer, the term of this patent is extended or adjusted under 35 U.S.C. 154(b) by 66 days.

(21) Appl. No.: 17/473,024

(22) Filed: Sep. 13, 2021

(65) Prior Publication Data

US 2023/0078227 A1    Mar. 16, 2023

(51) Int. Cl.
*H04N 21/442* (2011.01)
*H04L 51/10* (2022.01)
*H04N 21/45* (2011.01)

(52) U.S. Cl.
CPC ....... *H04N 21/44204* (2013.01); *H04L 51/10* (2013.01); *H04N 21/44213* (2013.01); *H04N 21/4532* (2013.01)

(58) Field of Classification Search
CPC ....... H04N 21/44204; H04N 21/44213; H04N 21/4532; H04L 51/10
See application file for complete search history.

(56) References Cited

U.S. PATENT DOCUMENTS

| | | | | |
|---|---|---|---|---|
| 9,049,076 | B1* | 6/2015 | Ramachandran | H04L 67/306 |
| 2012/0143693 | A1* | 6/2012 | Chung | G06Q 30/0241 |
| | | | | 709/224 |
| 2014/0040010 | A1* | 2/2014 | Garcia-Martinez | G06Q 50/01 |
| | | | | 709/204 |
| 2016/0180376 | A1* | 6/2016 | Lu | G06Q 30/0244 |
| | | | | 705/14.43 |
| 2016/0189243 | A1* | 6/2016 | Sharp | G06Q 30/0257 |
| | | | | 705/14.55 |
| 2017/0046741 | A1* | 2/2017 | Hunter | G06Q 30/0275 |
| 2017/0124199 | A1* | 5/2017 | Fu | H04L 67/535 |
| 2017/0295361 | A1* | 10/2017 | Dashwood | H04N 13/344 |
| 2018/0219830 | A1* | 8/2018 | O'Brien | H04L 51/48 |
| 2018/0285469 | A1* | 10/2018 | Hahn | G06F 16/93 |

* cited by examiner

*Primary Examiner* — John W Miller
*Assistant Examiner* — Akshay Doshi
(74) *Attorney, Agent, or Firm* — Cooper Legal Group LLC

(57) ABSTRACT

One or more computing devices, systems, and/or methods are provided. In an example, a sequence of actions performed using a first interface on a first client device may be identified. A first negative signal probability may be determined based upon the sequence of actions. The first negative signal probability may correspond to a probability of receiving a negative signal associated with a first content item from the first client device responsive to presenting the first content item via the first interface on the first client device. The first interface on the first client device may be controlled based upon the first negative signal probability.

20 Claims, 9 Drawing Sheets

NEGATIVE SIGNAL PROBABILITY DETERMINATION AND CONTENT ITEM SELECTION

BACKGROUND

Many services, such as websites, applications, etc. may provide platforms for viewing media. For example, a user may interact with a service. While interacting with the service, selected media may be presented to the user automatically.

SUMMARY

In accordance with the present disclosure, one or more computing devices and/or methods are provided. In an example, a sequence of actions performed using a first interface on a first client device may be identified. A first negative signal probability may be determined based upon the sequence of actions (and/or based upon other information in addition to the sequence of actions). The first negative signal probability may correspond to a probability of receiving a negative signal associated with a first content item from the first client device in response to presenting the first content item via the first interface on the first client device. The first interface on the first client device may be controlled based upon the first negative signal probability.

In an example, a sequence of actions performed using a first interface on a first client device may be identified. A request to provide content for presentation via the first interface on the first client device may be transmitted to a content system, wherein the request is indicative of the sequence of actions and user identification information associated with the first client device.

In an example, a request may be received from a communication system controlling a communication interface on a first client device. The request may correspond to a request to provide content for presentation via the communication interface on the first client device. The request may be indicative of a sequence of actions performed using the communication interface on the first client device. A plurality of negative signal probabilities associated with a plurality of content items may be determined based upon the sequence of actions (and/or based upon other information in addition to the sequence of actions). A first negative signal probability of the plurality of negative signal probabilities may be associated with a first content item of the plurality of content items. The first negative signal probability of the plurality of negative signal probabilities may correspond to a probability of receiving a negative signal associated with the first content item from the first client device in response to presenting the first content item via the communication interface on the first client device. Whether to present the first content item via the communication interface on the first client device may be determined based upon the plurality of negative signal probabilities.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
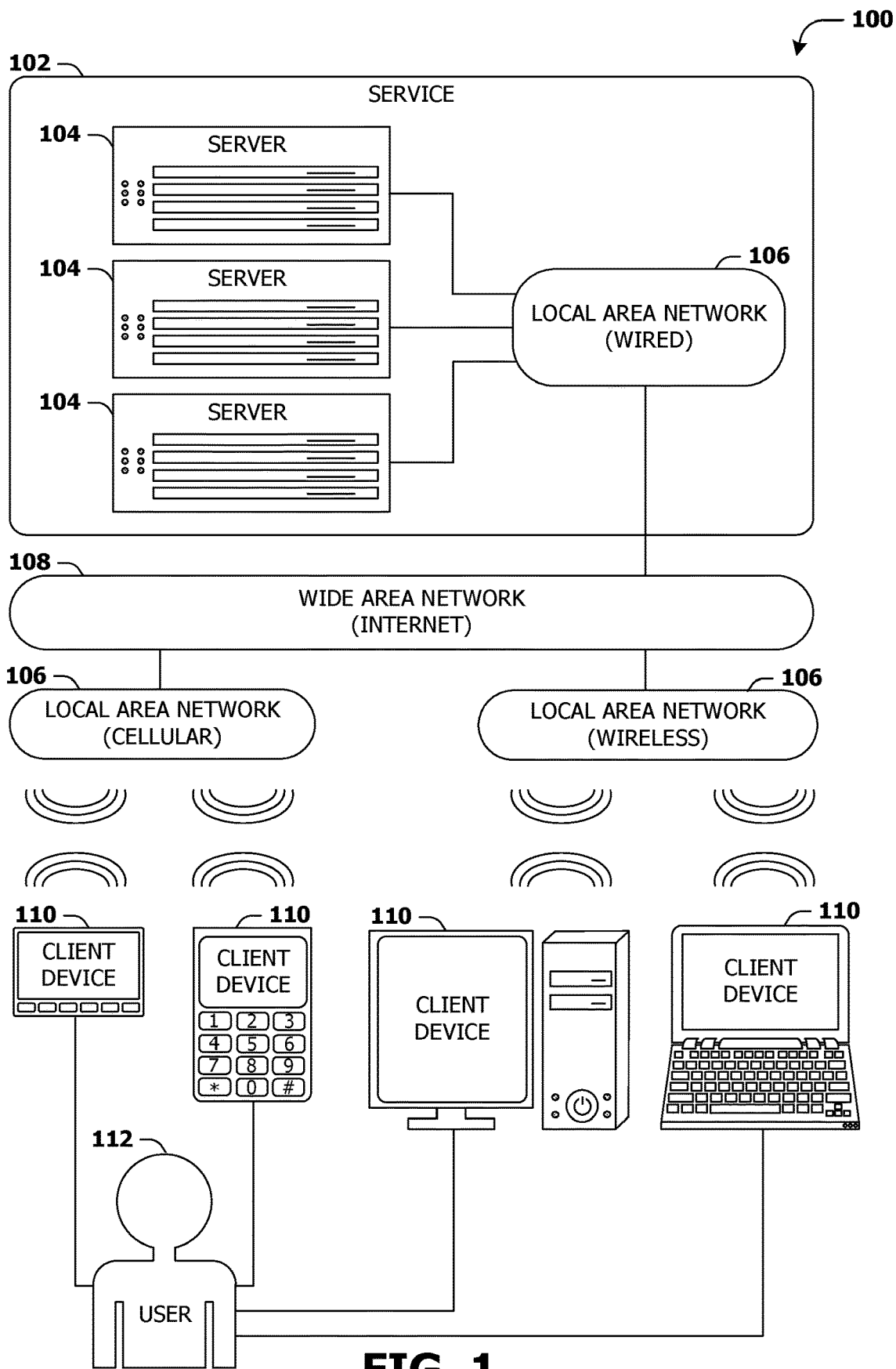
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
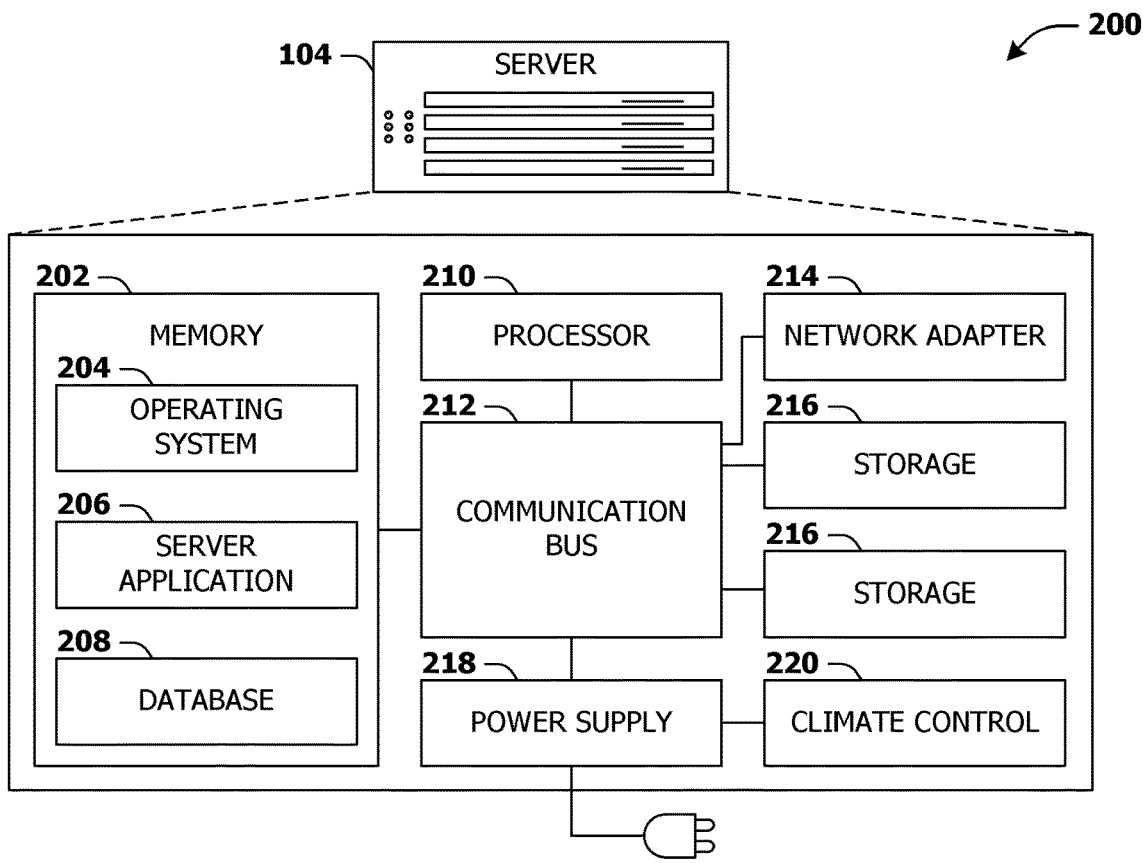
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
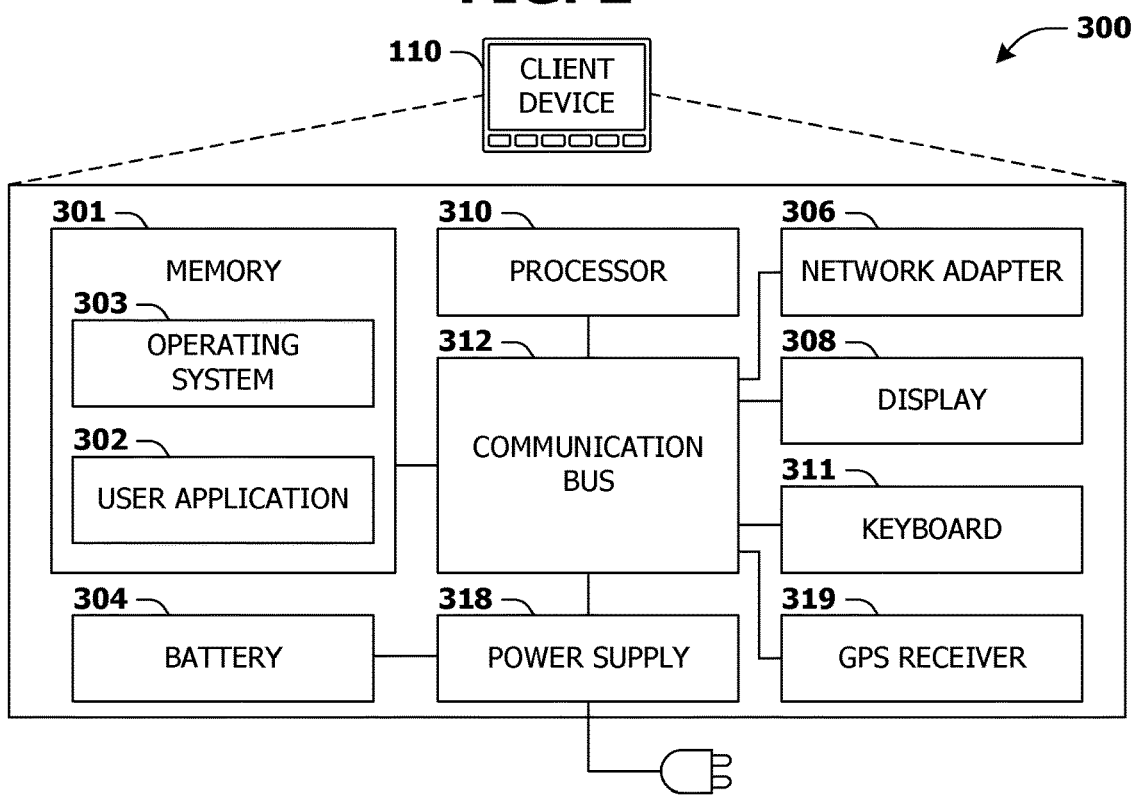
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining (e.g., predicting) negative signal probabilities associated with content items and/or selecting content for transmission to devices are provided. For example, a user (and/or a device associated with the user) may access and/or interact with a service, such as an email interface, a browser, software, a website, an application, an operating system, etc. that provides a platform for viewing and/or downloading content (e.g., emails, videos, web pages, etc.) from a server associated with a content system. In some examples, the content system may use user information, such as a user profile comprising activity information (e.g., search history information, website browsing history, email information, etc.), user demographic information, location information, etc. to determine interests of the user. A first content item may be selected for transmission to the device based upon the user profile. However, a negative signal associated with the first content item may be received from the device. The negative signal may be indicative of the first content item being closed using the device. Alternatively and/or additionally, the negative signal may be indicative of the user not having an interest in the first content item. The negative signal and/or the first content item being closed using the device may be associated with a loss (e.g., a revenue loss) incurred by an entity associated with the content system (e.g., the loss may occur as a result of the first content item being closed and/or the negative signal being received).

Thus, in accordance with one or more of the techniques presented herein, a sequence of actions performed using a first interface on a first client device may be identified. The sequence of actions may be performed during an activity session (e.g., a current activity session). A first negative signal probability may be determined based upon the sequence of actions. The first negative signal probability may correspond to a probability of receiving a negative signal associated with a first content item from the first client device responsive to presenting the first content item via the first interface on the first client device. The first interface on the first client device may be controlled based upon the first negative signal probability. For example, whether or not to present the first content item may be determined based upon the first negative signal probability. Alternatively and/or additionally, a plurality of negative signal probabilities associated with a plurality of content items may be determined based upon the sequence of actions, and/or a content item of the plurality of content items may be selected for presentation via the first interface on the first client device based upon the plurality of negative signal probabilities.

It may be appreciated that by determining whether or not to present the first content item via the first interface on the first client device and/or by selecting a content item for presentation via the first interface based upon the plurality of negative signal probabilities, a probability that a negative signal associated with the first content item is received may be reduced. Further, reception of negative signals may be indicative of a negative user experience that can translate to losses (e.g., long-term losses over time). Thus, selecting content items for presentation based upon negative signal probabilities (such that presented content items have a reduced chance of being closed, for example) may result in an improved user experience, wherein the improved user experience may result in reduced losses (e.g., revenue losses) and/or increased gains (e.g., revenue gains).

Alternatively and/or additionally, by determining the first negative signal probability based upon the sequence of actions (performed during the current activity session, for example), the first negative signal probability may be determined with an increased accuracy (e.g., the sequence of user actions may indicate a user's disposition and/or likelihood to close a content item, such as an advertisement, that is presented via the first interface on the first client device and/or the sequence of user actions may assist in more accurately predicting the first negative signal probability).

Figure 4:
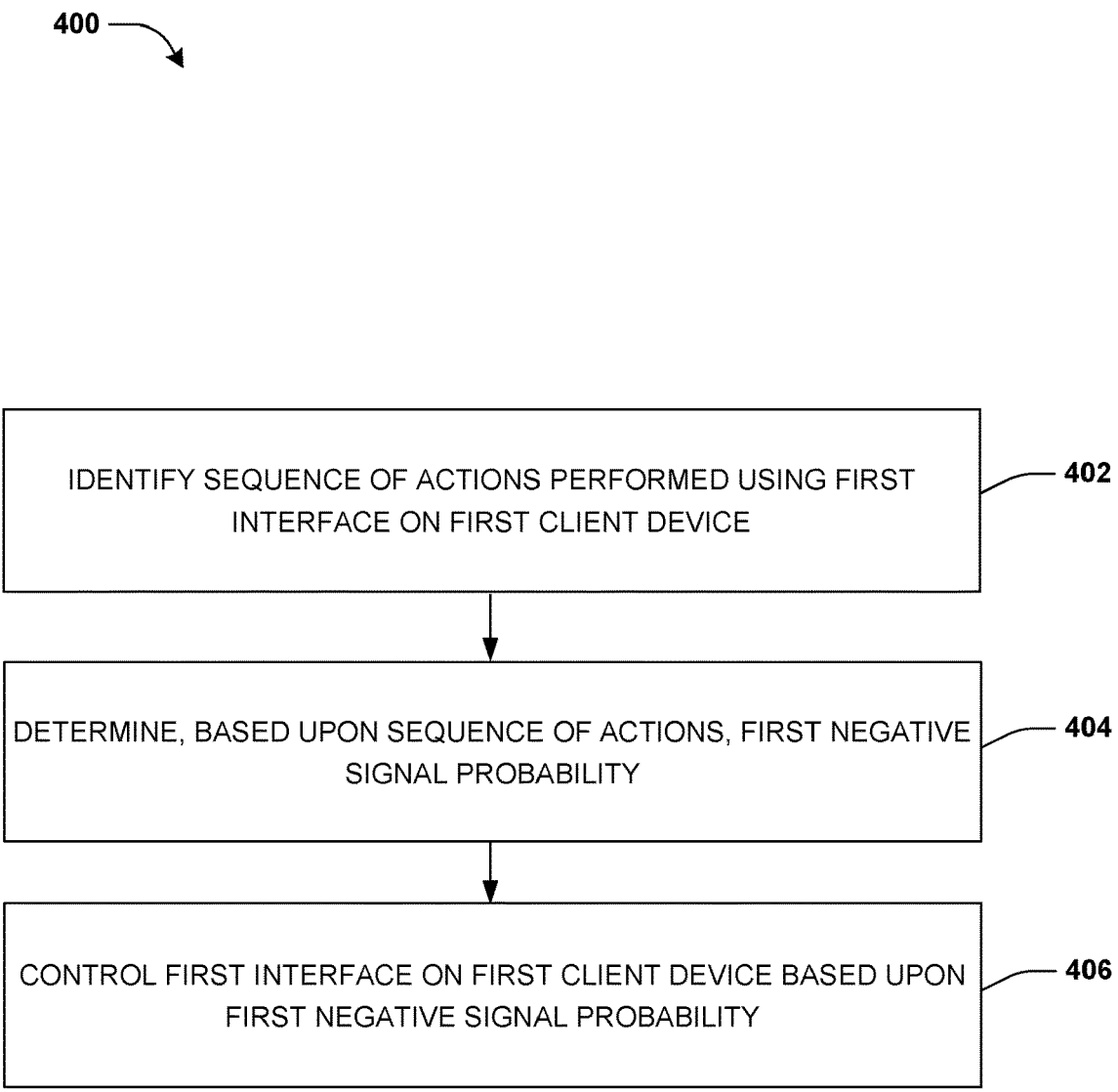
FIG. 4 is a flow chart illustrating an example method for determining negative signal probabilities associated with content items and/or selecting content for transmission to devices.

An embodiment of determining (e.g., predicting) negative signal probabilities associated with content items and/or selecting content for transmission to devices is illustrated by an example method 400 of FIG. 4. A first user, such as user Jill, may access and/or interact with a first interface on a first client device. In some examples, the first interface is a first communication interface (e.g., an email interface, a messaging interface, a social network interface, etc.) for sending and/or receiving emails, uploading social media posts, and/or performing communications via messaging, voice calls, video calls, etc. The first interface may be associated with a first system. In an example in which the first interface is the first communication interface, the first system may be a communication system (e.g., an email service provider, a communication service provider, etc.).

In some examples, a first user account (e.g., at least one of an email account, a messaging account, a social media account, a video streaming account, an audio streaming account, etc.) of the first system may be accessed and/or interacted with via the first interface. The first interface may be an email client, a messaging client, a content interface, an audio streaming interface, a video streaming interface, a news interface, a web interface accessed via a browser (e.g., a web email interface, a web messaging interface, a web social media interface, etc.), an application (e.g., an email application, a messaging application, a social media application, an audio streaming application, a video streaming application, a news application, etc.), etc.

In some examples, a graphical user interface of the first client device may be controlled to display the first interface.

In an example in which the first interface is the first communication interface, a plurality of messages (e.g., a plurality of emails, a plurality of instant messages, etc.) associated with the first user account may be accessed using the first communication interface. For example, a portion of the plurality of messages may comprise messages that are transmitted by the first user account to one or more user accounts (e.g., sent messages). Alternatively and/or additionally, a portion of the plurality of messages may comprise messages that are received by the first user account from one or more user accounts (e.g., received messages).

Figure 5A:
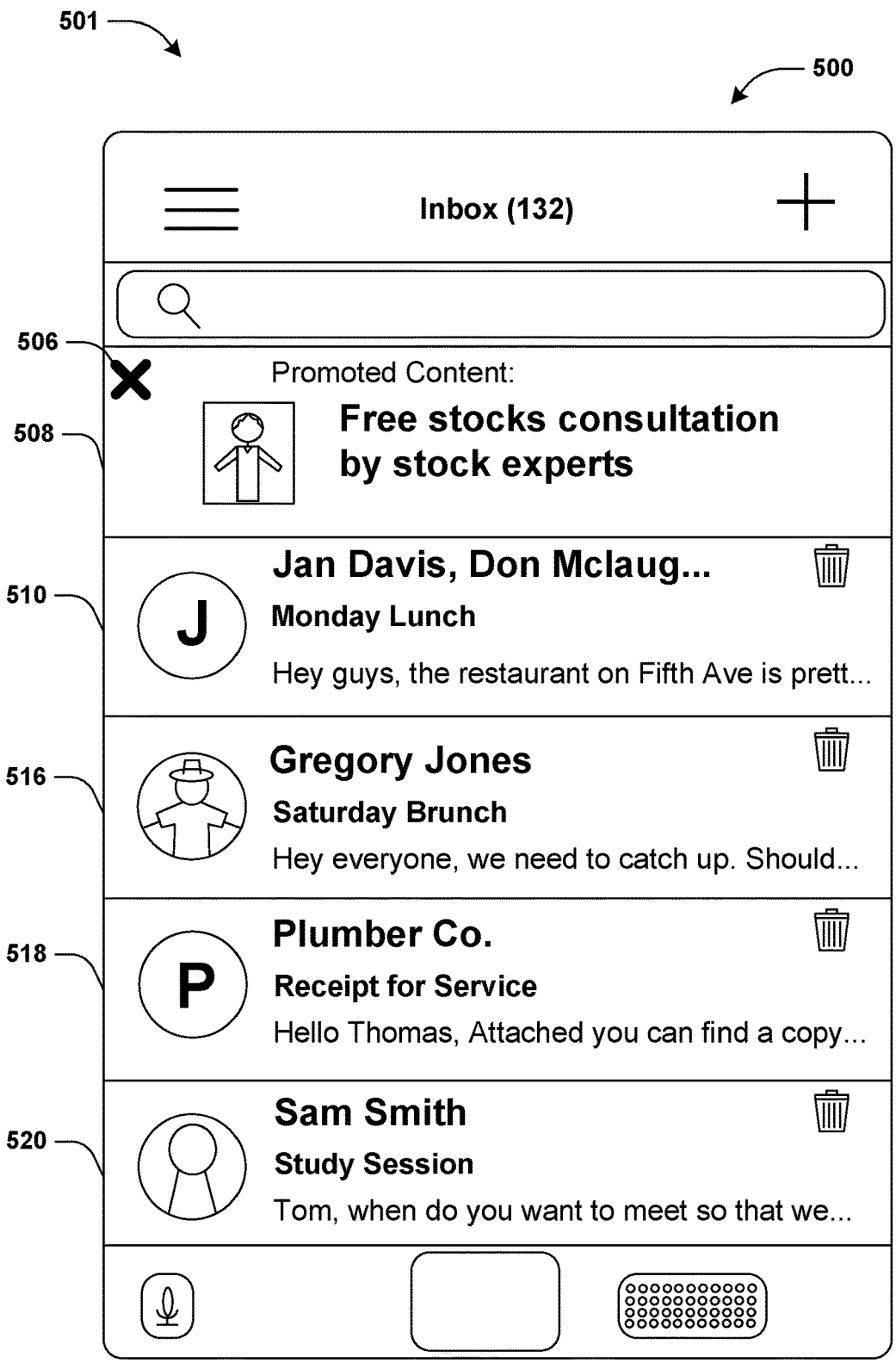
FIG. 5A is a component block diagram illustrating an example system for determining negative signal probabilities associated with content items and/or selecting content for transmission to devices, where a first client device presents a first interface.

FIGS. 5A-5E illustrate examples of a system 501 for determining (e.g., predicting) negative signal probabilities associated with content items and/or selecting content for transmission to devices, described with respect to the method 400 of FIG. 4. FIG. 5A illustrates the first client device (shown with reference number 500) presenting the first interface. In the example shown in FIG. 5A, the first interface is the first communication interface (e.g., an email interface for sending and/or receiving emails). For example, the first interface may comprise a list of email items, such as a first email item 510, a second email item 516, a third email item 518 and/or a fourth email item 520. In some examples, in response to a selection of an email item of the list of email items, an email corresponding to the email item may be opened and/or displayed via the first interface.

In some examples, a content system may provide one or more content items to be presented via the first interface. The content system may be an advertisement system (e.g., an online advertising system). Alternatively and/or additionally, the content system may not be an advertisement system. In some examples, the content system may provide content items (e.g., advertisements, images, links, videos, etc.) to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to consume and/or interact with the content item before the user can access content of a web page, utilize resources of an application and/or play a game.

In some examples, the first interface may present a first content item 508. For example, the first content item 508 may be provided (by the content system, for example) for presentation via the first interface on the first client device 500. The first content item 508 may be presented in response to receiving a first request for content (e.g., a first request to provide content for presentation via the first interface on the first client device 500). In an example, the first request for content may be received (by the content system, for example) from the first system and/or the first client device 500. For example, in response to receiving the first request for content, the content system may select the first content item 508 (such as using one or more of the techniques provided herein) and/or transmit the first content item 508 to the first client device 500 for presentation via the first interface. In some examples, the first content item 508 may comprise at least one of an advertisement, an image, a video, a link, etc.

In some examples, a first negative signal associated with the first content item 508 may be received from the first client device 500. In some examples, the first negative signal corresponds to an indication of the first content item 508 being closed via the first client device 500. In an example, the first negative signal may be received in response to a selection of a selectable input 506 (e.g., "X") displayed adjacent to and/or overlaying the first content item 508. The negative signal may correspond to a request to close (and/or to not present and/or to not display) the first content item 508 (e.g., hide the first content item 508 from view). Alternatively and/or additionally, the negative signal may correspond to a request to remove the first content item 508 from the first interface. In some examples, in response to a selection of the selectable input 506 and/or in response to receiving the negative signal, the first content item 508 may be closed, may be hidden from view and/or may no longer be displayed. Alternatively and/or additionally, the negative signal may be received by receiving at least one of a voice command to close the first content item 508, a swipe on the first content item 508 using a touchscreen, etc.

Alternatively and/or additionally, responsive to a selection of the selectable input 506 and/or responsive to receiving the first negative signal, a feedback interface may be displayed via the first interface. One or more first user-input reasons associated with why the first user is not interested in and/or does not like the first content item 508 (e.g., one or more reasons that the first user selected the selectable input 506) may be received from the first client device 500 via the feedback interface. For example, the one or more first user-input reasons may be determined based upon one or more selections of one or more selectable inputs corresponding to the one or more first user-input reasons. Alternatively and/or additionally, the one or more first user-input reasons may be determined based upon text input (by the first user) via a text area of the feedback interface.

In an example, the one or more first user-input reasons may be indicative of the first content item 508 being offensive to the first user (e.g., the first content item 508 may comprise text and/or one or more images offensive to the first user). In another example, the one or more first user-input reasons may be indicative of the first content item 508 being irrelevant to the first user (e.g., the first content item 508 may be associated with a topic that the first user does not have an interest in, the first content item 508 may advertise an entity that the first user does not have an interest in, etc.). In another example, the one or more first user-input reasons may be indicative of the first user having seen the first content item 508 (and/or content items similar to the first content item 508) previously (e.g., the first content item 508 and/or content items similar to the first content item 508 may have previously been presented via the first client device 500 one or more times).

First activity performed using the first interface may be detected. The first activity may comprise actions performed using the first interface, such as opening and/or presenting content (e.g., at least one of a message such as an email, an article such as a news article, a video clip, an audio clip, a social media post, etc.), sending a message (e.g., sending an email), posting a comment, inputting text into one or more text areas of the first interface (for composing one or more email messages, for example), deleting content (e.g., deleting a message such as an email of the first user account, for example), replying to a message (e.g., replying to a message), archiving a message (e.g., archiving an email), setting and/or adjusting one or more settings associated with the first user account via the first interface, accessing and/or interacting with one or more internet resources (e.g., one or more web pages) via the first interface, etc. In an example, one or more actions of the first activity performed using the first interface may be performed by selecting selectable inputs of the first interface, such as using a touchscreen (e.g., of the first client device 500), one or more switches (e.g., one or more buttons), a conversational interface (e.g., a voice recognition and natural language interface), etc.

In some examples, the first activity may be performed during a first activity session. The first activity session may correspond to a period of time during which a period of inactivity of the first interface on the first client device does not exceed a threshold duration of inactivity. A period of inactivity of the first interface may correspond to a period of time in which the first interface is at least one of not open on the first client device 500, not interacted with via the first client device 500, etc. A beginning of the first activity session may correspond to a time at which one or more actions (of the first activity) are performed after a period of inactivity that exceeds the threshold duration of inactivity. In an example, the period of inactivity may correspond to a period of time between the first activity session and a second activity session preceding the first activity session (e.g., the second activity session may correspond to a most recent activity session of the first interface prior to the first activity session). In some examples, the first activity session may be determined to be concluded in response to detecting a period of inactivity of the first interface that exceeds the threshold duration of inactivity.

At 402, a first sequence of actions performed using the first interface on the first client device may be identified. For example, the first activity (of the first activity session) may be analyzed to identify the first sequence of actions. In an example, the first sequence of actions may be indicative of one or more actions performed using the first interface during the first activity session. Alternatively and/or additionally, the first sequence of actions may be indicative of an order in which the one or more actions are performed.

Figure 5B:
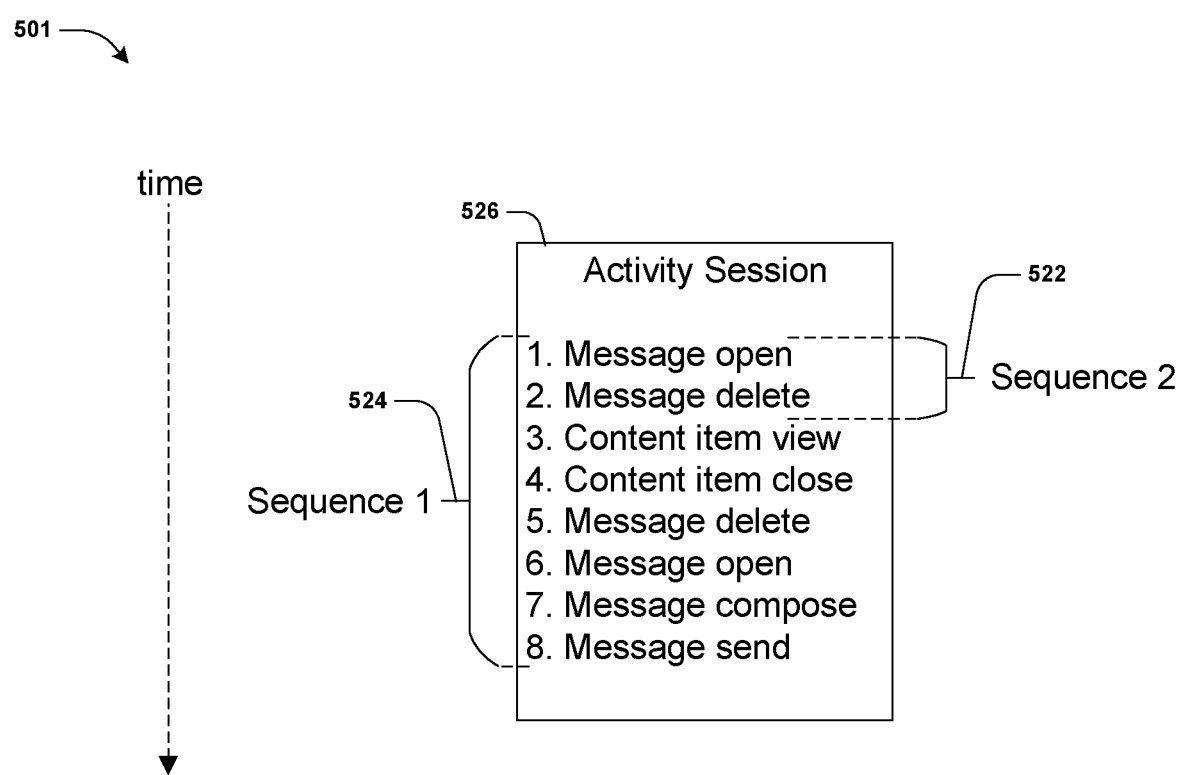
FIG. 5B is a component block diagram illustrating an example system for determining negative signal probabilities associated with content items and/or selecting content for transmission to devices, where a first sequence of actions is identified.

FIG. 5B illustrates identification of the first sequence of actions (labeled "Sequence 1" and shown with reference number 524). In the example shown in FIG. 5B, the first activity session (shown with reference number 526) may comprise actions associated with the communication interface (e.g., email interface), such as at least one of 1. message open (e.g., opening a message such as an email), 2. message delete (e.g., deleting a message such as an email), 3. content item view (e.g., displaying a content item such as an advertisement), 4. content item close (e.g., closing a content item such as an advertisement), 5. message delete, 6. message open, 7. message compose (e.g., composing a message such as an email), 8. message send (e.g., sending a message such as an email), etc. As shown in FIG. 5B, the first sequence of actions 524 may indicate an order in which the actions of the first activity session 526 are performed. Alternatively and/or additionally, the first sequence of actions 524 may indicate times associated with the actions (e.g., the first sequence of actions 524 may indicate a time at which an action of the first activity session 526 is performed).

In an example, the first content item 508 (shown in FIG. 5A) may be selected and/or presented via the first interface based upon a second sequence of actions 522 (labeled "Sequence 2"). The second sequence of actions 522 may comprise one or more actions, of the first activity session 526, prior to presentation of the first content item 508. The second sequence of actions 522 may be a subset of the first sequence of actions 524. In an example, the action "3. content item view" (shown in FIG. 5B) of the first activity session 526 may correspond to presentation of the first content item 508 and/or the action "4. content item close" may correspond to the first content item 508 being at least one of closed, hidden from view, etc. For example, the action "4. content item close" may be associated with (and/or determined based upon) reception of the first negative signal.

In some examples, the first sequence of actions 524 may be identified in response to at least one of identifying a content item opportunity (e.g., an opportunity to present a content item, such as an advertisement, via the first interface on the first client device 500), determining (and/or deciding) to present a content item (e.g., an advertisement) via the first interface on the first client device 500, receiving a request to access an internet resource via the first interface (e.g., an internet resource on which a content item, such as an advertisement, can be presented, such as at least one of a message such as an email, a list of messages such as an email inbox, an article, a list of articles, a video clip, an audio clip, a web page, etc.), etc.

In some examples, the first system may transmit a second request for content to the content system in response to at least one of identifying the content item opportunity, determining (and/or deciding) to present a content item via the first interface, receiving the request to access the internet resource, etc. The second request for content may be a request (e.g., a serving request) to provide content for presentation via the first interface on the first client device 500. Alternatively and/or additionally, the second request for content may be received (by the content system, for example) from the first client device 500.

Figure 5C:
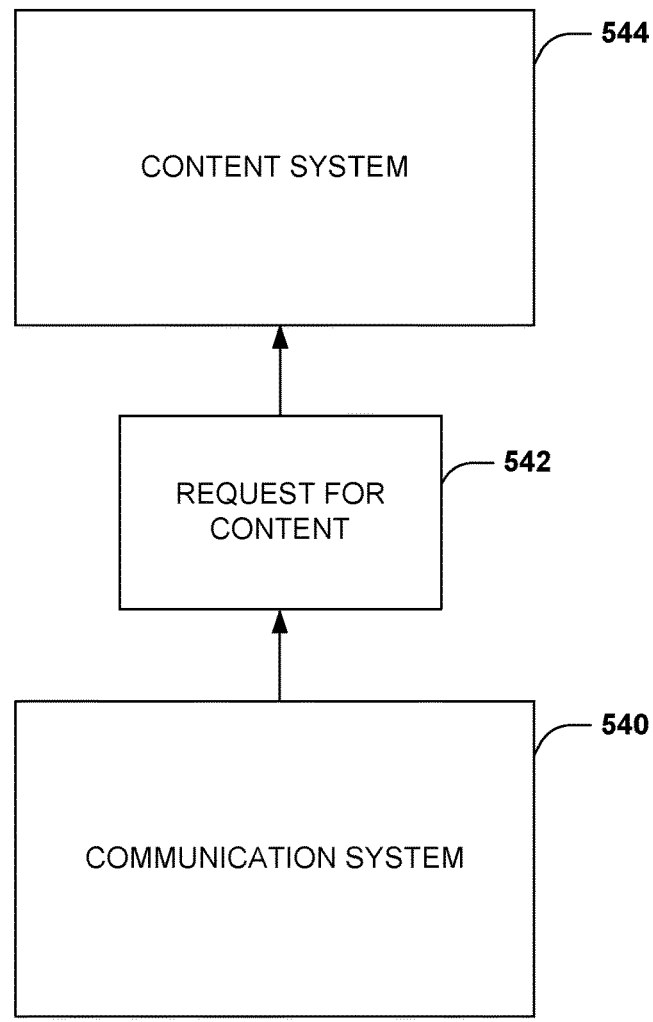
FIG. 5C is a component block diagram illustrating an example system for determining negative signal probabilities associated with content items and/or selecting content for transmission to devices, where a first system transmits a request for content to a content system.

FIG. 5C illustrates the first system (shown with reference number 540), such as the communication system, transmitting the second request for content (shown with reference number 542) to the content system (shown with reference number 544). The second request for content 542 may be indicative of user identification information (associated with the first client device 500 and/or the first user account, for example). The user identification information may be indicative of at least one of the first client device 500, a device identifier associated with the first client device 500, an IP address associated with the first client device 500, a media access control (MAC) address associated with the first client device 500, a carrier identifier indicative of carrier information associated with the first client device 500, a user identifier (e.g., at least one of a username, an email address, a user account identifier, etc.) associated with the first client device 500 and/or the first user account, a browser cookie (and/or a cookie identifier associated with the first client device 500), etc.

The second request for content 542 may be indicative of the first sequence of actions 524. For example, the second request for content 542 may comprise activity sequence information indicative of the first sequence of actions 524. In an example, the activity sequence information may comprise indications of actions of the first sequence of actions 524 and/or may be indicative of an order in which the actions of the first sequence of actions 524 are performed. Alternatively and/or additionally, the activity sequence information may comprise one or more n-grams. The one or more n-grams may be generated based upon the first sequence of actions 524. An n-gram of the one or more n-grams (and/or each n-gram of the one or more n-grams) may correspond to an action (or a combination of multiple adjacent actions) of the first sequence of actions 524. In some examples, the one or more n-grams may be indicative of an order in which actions of the first sequence of actions 524 are performed.

In an example, the one or more n-grams may comprise a set of unigrams (e.g., n=1) corresponding to the first sequence of actions 524, wherein a unigram of the set of unigrams (and/or each unigram of the set of unigrams) indicates one action of the first sequence of actions 524. In an example with respect to FIG. 5B, the unigrams may comprise a first unigram indicating the action "1. message open", a second unigram indicating the action "2. message delete", a third unigram indicating the action "3. content item view", etc.

In an example, the one or more n-grams may comprise a set of bigrams (e.g., n=2) corresponding to the first sequence of actions 524, wherein a bigram of the set of bigrams (and/or each bigram of the set of bigrams) indicates two actions (e.g., adjacent actions) of the first sequence of actions 524. In an example with respect to FIG. 5B, the bigrams may comprise a first bigram indicating two adjacent actions comprising the action "1. message open" and the action "2. message delete", a second bigram indicating two adjacent actions comprising the action "2. message delete" and the action "3. content item view", a third bigram indicating two adjacent actions comprising the action "3. content item view" and the action "4. content item delete", etc.

In an example, the one or more n-grams may comprise a set of trigrams (e.g., n=3) corresponding to the first sequence of actions 524, wherein a trigram of the set of trigrams (and/or each trigram of the set of trigrams) indicates three actions (e.g., adjacent actions) of the first sequence of actions 524. In an example with respect to FIG. 5B, the trigrams may comprise a first trigram indicating three adjacent actions comprising the action "1. message open", the action "2. message delete" and the action "3. content item view", a second trigram indicating three adjacent actions comprising the action "2. message delete", the action "3. content item view" and the action "4. content item delete", a third trigram indicating three adjacent actions comprising the action "3. content item view", the action "4. content item delete" and the action "5. message delete", etc.

In some examples, the one or more n-grams may comprise the set of unigrams, the set of bigrams and/or the set of trigrams. Alternatively and/or additionally, the one or more n-grams may comprise one or more other types of n-grams other than unigrams, bigrams and/or trigrams (such as at least one of four-grams, five-grams, etc.).

At 404, a first negative signal probability associated with a second content item may be determined (e.g., predicted) based upon the first sequence of actions 524 (and/or based upon other information in addition to the first sequence of actions 524). For example, the first negative signal probability may be determined based upon the activity sequence information indicative of the first sequence of actions 524. In some examples, the first negative signal probability associated with the second content item may be determined by the content system 544 (and/or the first system 540).

In some examples, the first negative signal probability corresponds to a probability of receiving a negative signal associated with the second content item from the first client device 500 in response to presenting the second content item via the first interface on the first client device 500. For example, the first negative signal probability may correspond to a probability of the second content item being closed if the second content item is presented via the first interface on the first client device 500.

In some examples, a plurality of negative signal probabilities of receiving negative signals associated with a plurality of content items may be determined (e.g., predicted). In some examples, the plurality of content items may comprise content items participating in a content selection process, an auction and/or a bidding process performed in response to the second request for content 542. A negative signal probability of the plurality of negative signal probabilities may correspond to a probability of receiving a negative signal associated with a content item of the plurality of content items in response to presenting the content item via the first interface on the first client device 500 (e.g., the negative signal probability may correspond to a probability of the content item being closed if the content item is presented via the first interface on the first client device 500). The plurality of negative signal probabilities may comprise the first negative signal probability.

The plurality of negative signal probabilities associated with the plurality of content items may be determined based upon the first sequence of actions 524. For example, the plurality of negative signal probabilities may be determined based upon the activity sequence information indicative of the first sequence of actions 524.

In some examples, the first sequence of actions 524 and/or the activity sequence information may not comprise and/or be indicative of content of messages (e.g., emails) of the first user account. Accordingly, in an example in which the first sequence of actions 524 and/or the activity sequence information do not comprise and/or are not indicative of content of messages (e.g., emails) of the first user account, analyzing and/or using the first sequence of actions 524 and/or the activity sequence information to determine the first negative signal probability (and/or the plurality of negative signal probabilities) may be performed while maintaining and/or protecting privacy of the first user.

In some examples, the activity sequence information may be indicative of one or more actions, other than the first sequence of actions 524, of the first user during the first activity session, such as at least one of interactions with one or more internet resources outside the first interface, eye movements (detected via eye tracking, for example), one or more user movements (detected via a camera, for example), etc.

In some examples, the first negative signal probability (and/or the plurality of negative signal probabilities) may be determined based upon a first user profile associated with the first client device 500 and/or the first user account. In an example, the first user profile may be identified based upon the user identification information (associated with the first client device 500 and/or the first user account, for example). In an example, the first user profile may be identified (by the content system 544, for example) using the user identification information based upon the second request for content 542 comprising the user identification information. For example, a user information database comprising a plurality of user profiles may be analyzed to identify the first user profile (associated with the first client device 500 and/or the first user account, for example), such as based upon a determination that the identification information indicated by the first user profile matches the user identification information indicated by the second request for content 542.

In some examples, the first negative signal probability associated with the second content item (and/or the plurality of negative signal probabilities) may be determined based upon the first sequence of actions 524 and/or first user demographic information associated with the first client device 500 and/or the first user account. In an example, the first user demographic information may be determined based upon the first user profile (e.g., the first user profile may be indicative of the first user demographic information). The first user demographic information may be indicative of at least one of a gender associated with the first client device 500 and/or the first user account (e.g., a gender of the first user), an age associated with the first client device 500 and/or the first user account (e.g., an age of the first user), etc.

In an example, the first negative signal probability may be determined based upon the first sequence of actions 524, the first user demographic information and/or a plurality of sets of event information associated with a plurality of events in which content items (e.g., advertisements) are presented via the first interface (and/or one or more other interfaces) on client devices. For example, a first set of event information of the plurality of sets of event information may be associated with a first event of the plurality of events, a second set of event information of the plurality of sets of event information may be associated with a second event of the plurality of events, etc. In an example, the first event may comprise presentation of a third content item (e.g., a content item provided by the content system 544, such as an advertisement) via the first interface (or a different interface, such as an interface that is controlled by the first system 540 that controls the first interface and/or an interface that is not controlled by the first system 540) on a second client device. The first set of event information associated with the first event may be indicative of at least one of a third sequence of actions performed using the first interface (or the different interface) on the second client device, wherein the third sequence of actions may be performed prior to the presentation of the third content item and/or wherein the third sequence of actions may be performed during an activity session of the first interface (or the different interface) during which the third content item is presented. The first set of event information associated with the first event may be indicative of demographic information associated with the second client device (such as an age, gender, etc.). The first set of event information associated with the first event may be indicative of whether a negative signal associated with the third content item was received (and/or whether the third content item was closed and/or whether the third content item was hidden from view) after and/or during presentation of the third content item of the first event. In an example in which a negative signal associated with the third content item was received (and/or the third content item was closed and/or the third content item was hidden from view) after and/or during presentation of the third content item of the first event, the first set of event information (e.g., a label of the first set of event information) may indicate a first classification associated with the first event (e.g., negative signal event classification). In an example in which a negative signal associated with the third content item was not received after and/or during presentation of the third content item of the first event, the first set of event information (e.g., a label of the first set of event information) may indicate a second classification associated with the first event (e.g., no negative signal event classification).

In an example, the plurality of sets of event information may be analyzed based upon the first sequence of actions 524 to determine the first negative signal probability. For example, the first negative signal probability may be determined based upon a comparison of the first sequence of actions 524 with sequences of actions indicated by the plurality of sets of event information. In an example, the first negative signal probability may be determined based upon one or more sets of event information of the plurality of sets of event information. In an example, a set of event information of the one or more sets of event information may be identified (and/or selected for use in determining the first negative signal probability) based upon at least one of a determination that the set of event information is indicative of demographic information that matches and/or is similar to at least some of the first user demographic information (e.g., a second gender indicated by the set of event information matches the gender of the first user demographic information, a second age indicated by the set of event information is equal to the age of the first user demographic information and/or an age difference between the second age and the age of the first user demographic information is less than a threshold age difference), a determination that the set of event information is indicative of a sequence of actions having a pattern that matches and/or is similar to the first sequence of actions 524, a determination that the set of event information is indicative of one or more actions that match and/or are similar to one or more actions of the first sequence of actions 524, etc. In an example, the first negative signal probability may be determined based upon a measure of negative signal events of one or more events associated with the one or more sets of event information. For example, the measure of negative signal events may be determined based upon a quantity of events, of the one or more events, comprising reception of a negative signal, and/or a quantity of events, of the one or more events, that do not comprise reception of a negative signal (e.g., whether an event of the one or more events comprises reception of a negative signal may be determined based upon the one or more sets of event information).

In some examples, the first negative signal probability may be determined using a first model (e.g., a machine learning model) comprising at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In some examples, the first model may be trained using the plurality of sets of event information.

Figure 5D:
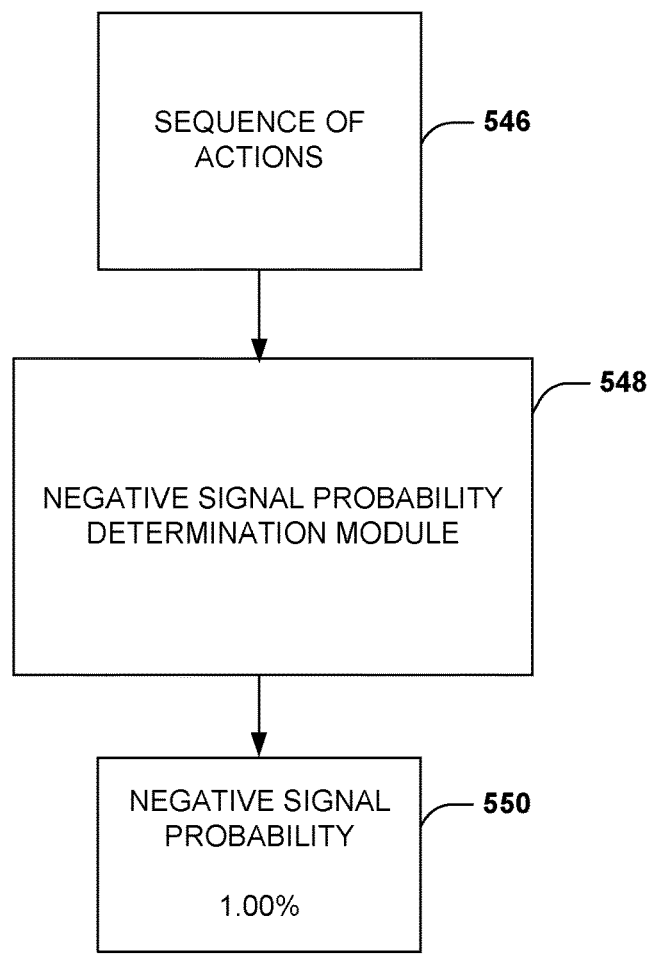
FIG. 5D is a component block diagram illustrating an example system for determining negative signal probabilities associated with content items and/or selecting content for transmission to devices, where a negative signal probability is determined.

In some examples, the first model may be trained and/or configured to determine a negative signal probability based upon a sequence of actions, such as the first sequence of actions 524. FIG. 5D illustrates the first negative signal probability (shown with reference number 550) being determined using the first model. In some examples, the first model may be loaded into a negative signal probability determination module 548. Information 546 indicative of the first sequence of actions 524 may be input to the negative signal probability determination module 548. In some examples, the information 546 may comprise the activity sequence information (e.g., the one or more n-grams). Alternatively and/or additionally, the information 546 may be indicative of the first user demographic information. Alternatively and/or additionally, the information 546 may be indicative of a first content item-based negative signal probability, associated with the second content item. In an example, the first content item-based negative signal probability may be determined based upon the second content item and/or the first user profile.

In an example, the information 546 may be indicative of features (used by the first model and/or the negative signal probability determination module 548 to determine the first negative signal probability 550, for example). The features may comprise the gender of the first user demographic information, the age of the first user demographic information, the first content item-based negative signal probability, and/or one or more activity sequence features based upon the activity sequence information (e.g., the one or more activity sequence features may comprise one, some and/or all of the one or more n-grams). Alternatively and/or additionally, the features may comprise an age representation of the age (such as a quantile discretized and/or binned representation of the age). In an example, the age representation may comprise an indication of an age bin (out of a plurality of age bins, wherein a quantity of age bins of the plurality of age bins may be between 10 and 30 such as 20, or a different quantity of age bins lower than 10 or higher than 30) corresponding to an age range comprising the age. Alternatively and/or additionally, the features may comprise a negative signal probability representation of the first content item-based negative signal probability (such as a quantile discretized and/or binned representation of the first content item-based negative signal probability). In an example, the negative signal probability representation may comprise an indication of a negative signal probability bin (out of a plurality of negative signal probability bins, wherein a quantity of negative signal probability bins of the plurality of negative signal probability bins may be between 80 and 110 such as 95, or a different quantity of negative signal probability bins lower than 80 or higher than 110) corresponding to a negative signal probability range comprising the first content item-based negative signal probability.

The negative signal probability determination module 548 may use the first model to perform one or more actions, such as at least one of one or more classification actions, one or more regression actions, one or more clustering actions, etc. For example, the negative signal probability determination module 548 may use the first model to output information based upon one or more inputs and/or use the information to provide one or more services. For example, the negative signal probability determination module 548 may use the first model to determine the first negative signal probability 550 based upon the information 546 and/or the features of the information 546. In an example shown in FIG. 5D, the negative signal probability determination module 548 may output the first negative signal probability 550 as 1.00% (e.g., a 1.00% probability that a negative signal associated with the second content item is received in response to presenting the second content item via the first interface on the first client device 500).

In an example, the first model may comprise a logistic regression model. The first model may comprise a bias and/or a weighted sum of the features (e.g., a weighted sum of features embedded in a sigmoid function). In some examples, the bias and/or weights associated with the features of the information 546 may be determined using at least one of stochastic gradient descent (SGD), L2 regularization, etc.

In an example, the first model may comprise one or more neural networks and/or may use one or more deep learning techniques (to determine the first negative signal probability 550, for example). For example, the one or more neural networks may comprise a first neural network and/or a second neural network. In some examples, the one or more activity sequence features may be input to the first neural network. The first neural network may comprise a recurrent neural network, such as a long short-term memory (LSTM) neural network (e.g., the first neural network may have an asynchronous stochastic gradient descent (ASGD) weight-dropped LSTM (AWD-LSTM) architecture). In an example, the first neural network may comprise one or more layers (e.g., stacked layers, such as three stacked layers) of LSTM used to train a second model (e.g., an action-based language model) of the first model. The second model may be an encoder in a classifier that comprises at least one of sequence of batch normalization, dropout, a linear layer and/or rectified linear activation function. In some examples, one or more features comprising a gender feature corresponding to the gender of the first user demographic information, an age feature corresponding to the age of the first user demographic information (e.g., the age feature may comprise the age and/or the age representation), and/or a negative signal probability feature corresponding to the first content item-based negative signal probability (e.g., the negative signal probability feature may comprise the first content item-based negative signal probability and/or the negative signal probability representation). The second neural network may be used to generate a vector based upon a feature of the one or more features (e.g., the second neural network may be used to map the feature into the vector). For example, for a feature of the one or more features (and/or for each feature of the one or more features), an embedding matrix (e.g., a learned embedding matrix) may map feature values of the feature into a vector (e.g., a fixed-size vector). In some examples, one or more feature embeddings (e.g., one or more vectors generated based upon the one or more features) may be combined (e.g., concatenated) into a vector (e.g., a single vector) and/or passed to one or more blocks (e.g., stacked blocks, such as three stacked blocks) comprising batch normalization, dropout, linear layer and/or rectified linear activation. In some examples, outputs of the first neural network and/or the second neural network may be combined (e.g., concatenated) into a vector (e.g., a single vector). The first negative signal probability 550 may be determined based upon the vector (e.g., using a linear layer of the second model, for example). In some examples, the first model (e.g., the one or more neural networks) may be trained and/or optimized using a cross-entropy loss function and/or SGD-based optimization of one or more objective functions (e.g., the one or more objective functions may comprise cross-entropy and/or one or more other functions), where the SGD-based optimization may be used to learn model parameters (e.g., parameters of the first model).

In some examples, the first content item-based negative signal probability may be determined based upon the first user profile and/or first content item information associated with the second content item. In some examples, the first user profile may be indicative of a plurality of negative content items. For example, the plurality of negative content items may comprise content items associated with negative signals received from the first client device 500 (and/or from a different device associated with the first user profile, such as a different device logged into the first user account). For example, in response to presenting content items of the plurality of negative content items via the first client device 500 (and/or from a different device associated with the first user profile, such as a different device logged into the first user account), negative signals associated with the content items have been received from the first client device 500. In an example in which the first negative signal associated with the first content item 508 is received from the first client device 500, an indication of the first content item 508 may be included in the first user profile (and/or the first content item 508 may be included in the plurality of negative content items indicated by the first user profile).

In some examples, in response to receiving the first negative signal and/or in response to including the first content item 508 in the plurality of negative content items, the first content item 508 may not be selected for transmission to the first client device 500. For example, in response to receiving a request for to provide content for presentation via the first client device 500 after receiving the first negative signal, a content item, different than the first content item 508, may be selected for transmission to the first client device 500 based upon the first content item 508 being included in the plurality of negative content items. Alternatively and/or additionally, content items may be temporarily included in the plurality of negative content items. For example, the first content item 508 may be removed from the plurality of negative content items a duration of time (e.g., at least one of two weeks, one month, etc.) after the first content item 508 is included in the plurality of negative content items. Accordingly, the first content item 508 may be selected for transmission to the first client device 500 after the duration of time after the first content item 508 is included in the plurality of negative content items.

Alternatively and/or additionally, the first user profile may be indicative of a plurality of negative topics associated with content items that are associated with negative signals received from the first client device 500. For example, in response to presenting content items associated with the plurality of negative topics via the first client device 500, negative signals associated with the content items have been received from the first client device 500. For example, one or more first topics associated with the first content item 508 may be determined. The one or more first topics may be determined by analyzing the first content item 508. Alternatively and/or additionally, the one or more first topics may be determined by analyzing the first content item information associated with the first content item 508. For example, the first content item information may be indicative of at least one of the one or more first topics associated with the first content item 508, a first entity associated with the first content item 508, one or more products and/or one or more services associated with the first content item 508 (e.g., the first entity may use the first content item 508 to advertise the one or more products and/or the one or more services associated with the first entity), etc. In some examples, in response to receiving the first negative signal and/or in response to including the first content item 508 in the plurality of negative content items, the one or more first topics may be included in the plurality of negative topics. In an example, the plurality of negative topics may comprise topics such as at least one of politics (e.g., political content), cars (e.g., content advertising cars), clothing, etc.

Alternatively and/or additionally, the first user profile may be indicative of a plurality of negative entities associated with content items that are associated with negative signals received from the first client device 500. For example, in response to presenting content items associated with the plurality of negative entities via the first client device 500, negative signals associated with the content items have been received from the first client device 500. For example, the first entity associated with the first content item 508 may be determined (e.g., the first content item 508 may be provided to the content system 544 for presentation via client devices by the first entity). In some examples, the first entity may be an advertiser, a company, a brand, an organization, etc. The first entity may be determined by analyzing the first content item 508. Alternatively and/or additionally, the first entity may be determined by analyzing the first content item information associated with the first content item 508. In some examples, in response to receiving the first negative signal and/or in response to including the first content item 508 in the plurality of negative content items, the first entity may be included in the plurality of negative entities. Alternatively and/or additionally, the first entity may be included in the plurality of negative entities in response to receiving a threshold quantity of negative signals associated with content items that are associated with the first entity. For example, the first entity may be included in the plurality of negative entities in response to receiving, from the first client device 500, the threshold quantity of negative signals (e.g., 5 negative signals, 10 negative signals, etc.) associated with content items provided by the first entity that are presented via the first client device 500.

Alternatively and/or additionally, the first user profile may be indicative of a plurality of user-input reasons associated with negative signals received in response to content items (e.g., content items of the plurality of negative content items) being presented via the first client device 500. In an example where the one or more first user-input reasons (associated with the first negative signal) are received from the first client device 500, the one or more first user-input reasons may be stored in the first user profile and/or included in the plurality of user-input reasons.

In some examples, the first content item-based negative signal probability may be determined based upon the first user demographic information (e.g., age, gender, etc.) and/or location information associated with the first client device 500 and/or the first user account (e.g., the first user profile may be indicative of the location information). For example, the first content item-based negative signal probability may be determined using the first user profile and/or other user profiles associated with other users that are determined to be related to the first user demographic information and/or the location information (e.g., similar ages, the same gender, the same region, etc.).

In some examples, the first content item-based negative signal probability associated with the second content item may be determined based upon the plurality of negative content items. In some examples, the plurality of negative content items may be analyzed to determine whether the plurality of negative content items comprises the second content item. In an example where it is determined that the second content item is included in the plurality of negative content items, the first content item-based negative signal probability associated with the second content item may be higher than in an example where it is determined that the second content item is not included in the plurality of negative content items.

Alternatively and/or additionally, the second content item may be compared with the plurality of negative content items to determine a similarity between the second content item and content items of the plurality of negative content items. The similarity may be determined based upon a type of content item of the second content item (e.g., the type of content item may be indicative of the second content item comprising at least one of an image, a video, a link, etc.) matching (e.g., being related to) types of content of content items of the plurality of negative content items (associated with negative signals). Alternatively and/or additionally, the similarity may be determined based upon a topic of the second content item matching topics of content items of the plurality of negative content items. Alternatively and/or additionally, the similarity may be determined based upon a second entity associated with the second content item matching entities associated with content items of the plurality of negative content items. Alternatively and/or additionally, the similarity may be determined based upon one or more products and/or one or more services associated with the second content item (e.g., the second content item may be used to advertise and/or promote the one or more products and/or the one or more services) matching products and/or services associated with content items of the plurality of negative content items. In some examples, the first content item-based negative signal probability may be determined based upon the similarity (e.g., a higher similarity between the second content item and content items of the plurality of negative content items may correspond to a higher probability of receiving a negative signal associated with the second content item from the first client device 500 in response to presenting the second content item via the first client device 500).

Alternatively and/or additionally, the first content item-based negative signal probability associated with the second content item may be determined based upon the plurality of negative topics of the first user profile. In some examples, one or more second topics associated with the second content item may be determined. The one or more second topics may be determined by analyzing the second content item. Alternatively and/or additionally, the one or more second topics may be determined by analyzing first content item information associated with the second content item. For example, the first content item information may be indicative of at least one of the one or more second topics associated with the second content item, the second entity associated with the second content item, the one or more products and/or the one or more services associated with the second content item, etc. In some examples, the first content item-based negative signal probability may be determined based upon whether the plurality of negative topics comprises the one or more second topics (e.g., the first content item-based negative signal probability may be higher in an example where a topic of the one or more second topics is included in the plurality of negative topics as compared with an example where the plurality of negative topics does not comprise a topic of the one or more second topics).

Alternatively and/or additionally, the first content item-based negative signal probability associated with the second content item may be determined based upon the plurality of negative entities of the first user profile. In some examples, the second entity associated with the second content item may be determined. The second entity may be determined by analyzing the second content item. Alternatively and/or additionally, the second entity may be determined by analyzing the first content item information associated with the second content item. In some examples, the first content item-based negative signal probability associated with the second content item may be determined based upon whether the plurality of negative entities comprises the second entity (e.g., the first content item-based negative signal probability may be higher in an example where the second entity is included in the plurality of negative entities as compared with an example where the plurality of negative entities does not comprise an entity of the one or more second entities).

Alternatively and/or additionally, the first content item-based negative signal probability associated with the second content item may be determined based upon the plurality of user-input reasons associated with negative signals received in response to content items being presented via the first client device 500. Alternatively and/or additionally, an offensive score indicative of a probability that the second content item is offensive to the first user associated with the first client device 500 may be determined. In some examples, the plurality of user-input reasons may be analyzed to identify one or more user-input reasons indicative of one or more content items offensive to the first user. The offensive score may be determined based upon the one or more user-input reasons. For example, in response to identifying the one or more user-input reasons associated with the one or more content items offensive to the first user, the one or more content items offensive to the first user may be analyzed to determine one or more characteristics associated with the one or more content items offensive to the first user. For example, the one or more characteristics may be indicative of the one or more content items offensive to the first user comprising images and/or text having at least one of profanity, a violent nature, etc. The second content item may be analyzed based upon the one or more characteristics associated with the one or more content items offensive to the first user to determine the offensive score associated with the second content item. In some examples, the first content item-based negative signal probability associated with the second content item may be determined based upon the offensive score (e.g., a higher offensive score associated with the second content item may correspond to a higher probability of receiving a negative signal associated with the second content item from the first client device 500 in response to presenting the second content item via the first client device 500).

In some examples, the first user profile may be indicative of a plurality of content item actions (e.g., content item selections and/or content item impressions) associated with the first client device 500 and/or the first user account. For example, the plurality of content item actions may comprise selections, via the first client device 500, of content items presented via the first client device 500. For example, the selections of the content items presented via the first client device 500 may be detected by monitoring user activity of the first client device 500. Alternatively and/or additionally, the selections of the content items presented via the first client device 500 may be received from the first client device 500. A selection of a content item may correspond to a click associated with the content item. Alternatively and/or additionally, the plurality of content item actions may comprise content item impressions (e.g., instances where content items are presented via the first client device 500 and/or instances where content items are consumed by the first user).

In some examples, the first content item-based negative signal probability associated with the second content item may be determined based upon the plurality of content item actions. For example, a plurality of selected content items may be determined based upon the plurality of content item actions. The plurality of selected content items may correspond to content items, presented via the first client device 500, that are selected (e.g., clicked) via the first client device 500. In some examples, a second similarity between the second content item and content items of the plurality of selected content items may be determined based upon the type of content item of the second content item matching types of content items of the plurality of selected content items. Alternatively and/or additionally, the second similarity may be determined based upon the one or more second topics associated with the second content item matching topics of content items of the plurality of selected content items. Alternatively and/or additionally, the second similarity may be determined based upon the second entity associated with the second content item matching entities associated with content items of the plurality of selected content items. Alternatively and/or additionally, the second similarity may be determined based upon the one or more products and/or the one or more services associated with the second content item matching products and/or services associated with content items of the plurality of selected content items. In some examples, the first content item-based negative signal probability may be determined based upon the second similarity (e.g., a higher similarity between the second content item and content items of the plurality of selected content items may correspond to a lower probability of receiving a negative signal associated with the second content item from the first client device 500 in response to presenting the second content item via the first client device 500).

In some examples, the first content item-based negative signal probability associated with the second content item may be determined based upon historical information associated with the second content item. A content item historical information database may be analyzed to identify the historical information associated with the second content item. In some examples, the historical information may be indicative of client devices used to present the second content item (e.g., the second content item may be transmitted to the client devices and/or the second content item may be presented via the client devices). Alternatively and/or additionally, the historical information may be indicative of negative signals received in association with presenting the second content item via client devices. For example, the historical information may be indicative of a quantity of content item impressions associated with the second content item, a quantity of client devices to which the second content item was transmitted and/or a quantity of negative signals received from client devices in response to presenting the second content item via the client devices. In some examples, the first content item-based negative signal probability associated with the second content item may be determined based upon the quantity of content item impressions associated with the second content item, the quantity of client devices to which the second content item was transmitted and/or the quantity of negative signals received from client devices in response to presenting the second content item via the client devices. Alternatively and/or additionally, a negative signal rate associated with the second content item may be determined based upon the historical information associated with the second content item. For example, the negative signal rate may be indicative of a relationship (e.g., at least one of a proportion, a ratio, a percentage, etc.) between a quantity of instances that the second content item is presented via client devices and a quantity of instances that negative signals are received in response to presenting the second content item. The first content item-based negative signal probability may be determined based upon the negative signal rate. In some examples, a higher negative signal rate may correspond to a higher probability of receiving a negative signal associated with the second content item from the first client device 500 in response to presenting the second content item via the first client device 500.

In some examples, the first content item-based negative signal probability associated with the second content item may be determined using a third model (e.g., a machine learning model), such as a latent factor model and/or a different type of machine learning model. For example, the third model may determine the first content item-based negative signal probability based upon the first user profile associated with the first client device 500, the historical information associated with the second content item and/or the first content item information associated with the second content item.

In some examples, the first negative signal probability 550 associated with the second content item may be determined based upon the first content item-based negative signal probability associated with the second content item. In an example, the first content item-based negative signal probability having a higher value may correspond to the first negative signal probability 550 having a higher value.

In some examples, other negative signal probabilities of the plurality of negative signal probabilities may be determined using one or more of the techniques provided herein with respect to determining the first negative signal probability 550 associated with the second content item.

At 406, the first interface on the first client device 500 is controlled based upon the first negative signal probability 550. For example, the first interface may be controlled by the first system 540 and/or the content system 544.

In an example, whether to present the second content item via the first interface on the first client device 500 may be determined based upon the first negative signal probability 550. The second content item may be presented or may not be presented via the first interface on the first client device 500 based upon the determination. In an example, it may be determined to present the second content item (and/or the second content item may be presented via the first interface on the first client device 500) based upon a determination that the first negative signal probability 550 is less than a first threshold negative signal probability. Alternatively and/or additionally, it may be determined not to present the second content item (and/or the second content item may not be presented via the first interface on the first client device 500) based upon a determination that the first negative signal probability 550 exceeds a second threshold negative signal probability.

In an example, whether to present a content item of the plurality of content items (e.g., whether to present any content item of the plurality of content items) via the first interface on the first client device 500 may be determined based upon the plurality of negative signal probabilities comprising the first negative signal probability 550. In an example, it may be determined not to present a content item (e.g., any content item) of the plurality of content items (and/or a content item of the plurality of content items may not be presented via the first interface on the first client device 500) based upon a determination that each negative signal probability of the plurality of negative signal probabilities exceeds the second threshold negative signal probability.

In an example, a content item may be selected from among the plurality of content items for presentation via the first client device 500 based upon the plurality of negative signal probabilities. For example, a plurality of content item scores associated with the plurality of content items may be determined based upon the plurality of negative signal probabilities. In an example, the plurality of content item scores may comprise a first content item score associated with the second content item. The second content item may be selected from among the plurality of content items for presentation via the first client device 500 based upon a determination that the first content item score exceeds a threshold content item score, based upon a determination that the first content item score is higher than other content item scores of the plurality of content item scores and/or based upon a determination that the first content item score is a highest content item score among the plurality of content item scores.

In some examples, the plurality of content item scores may be determined based upon a plurality of positive signal probabilities. The plurality of positive signal probabilities may comprise a first positive signal probability associated with the second content item. The first positive signal probability may correspond to a probability of receiving a positive signal associated with the second content item in response to presenting the second content item via the first interface on the first client device 500. In an example, the positive signal may correspond to an indication of a selection of the second content item (e.g., the first positive signal probability may be a click probability). Alternatively and/or additionally, the positive signal may correspond to an indication of a conversion event associated with the second content item (e.g., the first positive signal probability may be a conversion probability). The conversion event may correspond to a purchase of a product and/or service associated with the second content item (e.g., a purchase of a product and/or service advertised by the second content item) and/or a subscription to a service (e.g., a newsletter, a magazine, etc.) associated with the second content item. Alternatively and/or additionally, the positive signal may correspond to an indication of one or more interactions with the second content item (e.g., the first positive signal probability may be a probability that the first user interacts with the second content item in response to presentation of the second content item via the first interface on the first client device 500). Alternatively and/or additionally, the positive signal may correspond to an indication of the second content item being presented and/or the second content item being presented for longer than a threshold duration of time.

In some examples, the first positive signal probability may be determined based upon the first sequence of actions 524, the historical information associated with the second content item, the first content item information associated with the second content item, the plurality of content item actions and/or the plurality of selected content items. In an example, the historical information may be indicative of a first positive signal rate (e.g., at least one of a click rate, a conversion rate, etc.) associated with the second content item. The first positive signal rate may be indicative of a relationship between (e.g., one or more of a proportion, a ratio, a percentage, etc.) a quantity of instances that the second content item is presented via client devices and a quantity of instances that positive signals (e.g., indications of at least one of selections, conversion events, etc.) associated with the second content item are received (responsive to presenting the second content item). The first positive signal probability may be determined based upon the first positive signal rate (e.g., a higher positive signal rate associated with the second content item may correspond to a higher positive signal probability associated with the second content item).

In an example, the first content item score (associated with the second content item) may be determined based upon the first negative signal probability 550, the first positive signal probability and/or a first bid value associated with the second content item. In an example, the first bid value may be determined based upon a budget (e.g., a daily budget) and/or a target spend pattern associated with the second content item. Alternatively and/or additionally, the first bid value and/or the budget may be received from a device associated with one or more entities (e.g., an advertiser, a company, a brand, an organization, etc.) associated with the second content item. One or more operations (e.g., mathematical operations) may be performed to determine the first content item score based upon the first negative signal probability 550, the first positive signal probability and/or the first bid value.

In some examples, a first value may be generated based upon the first positive signal probability and/or the first bid value. For example, the first value may be generated by multiplying the first positive signal probability with the first bid value (e.g., the first value may correspond to a product of the first positive signal probability and the first bid value). In an example where the first positive signal probability is 2% and/or the first bid value is 1 (e.g., $1.00), the first value may be equal to 0.02×1=0.02.

In some examples, a first reduction value may be generated based upon the first negative signal probability. The first reduction value may be generated by performing one or more operations (e.g., mathematical operations) using the first negative signal probability and/or a first negative signal loss value. The first negative signal loss value may be indicative of a loss associated with reception of a negative signal associated with the second content item. For example, the first negative loss value may be indicative of a revenue loss (e.g., a monetary amount of loss) associated with receiving a negative signal associated with the second content item responsive to presenting the second content item via the first client device 500. For example, the revenue loss (e.g., the monetary amount of loss) may be a result of a negative user experience associated with reception of a negative signal associated with the second content item. The first reduction value may be generated by multiplying the first negative signal probability with the first negative signal loss value (e.g., the first reduction value may correspond to a product of the first negative signal probability and the first negative signal loss value). The first reduction value may correspond to an expected loss associated with transmission of the second content item to client devices (and/or to the first client device 500). In an example where the first negative signal probability is 4% and/or the first negative signal loss value is 0.2 (e.g., $0.20), the first reduction value may be equal to 0.04×0.2=0.008.

In some examples, the first content item score may be generated by reducing the first value by the first reduction value. For example, the first content item score may be equal to positiveProbability×bidValue−negativeProbability×negativeSignalLossValue, wherein positiveProbability corresponds to the first positive signal probability, bidValue corresponds to the first bid value, negativeProbability corresponds to the first negative signal probability and/or negativeSignalLossValue corresponds to the first negative signal loss value. In an example, where the first positive signal probability is 2%, the first bid value is 1 (e.g., $1.00), the first negative signal probability is 4% and/or the first negative signal loss value is 0.2 (e.g., $0.20), the first content item score may be equal to 0.02×1−0.04×0.2=0.012. It may be appreciated that by determining negative signal loss values (such as the first negative signal loss value) and/or accounting for the negative signal loss values in selecting content items for presentation via client devices, incurred losses associated with presenting content items (e.g., advertisements) via client devices may be reduced.

In some examples, other content item scores of the plurality of content item scores may be determined using one or more of the techniques provided herein with respect to determining the first content item score associated with the second content item.

In some examples, in response to selecting the second content item for presentation via the first interface on the first client device 500 (such as based upon a determination that the first content item score is the highest content item score of the plurality of content item scores), the second content item may be transmitted to the first client device 500 for presentation via the first interface. In some examples, the second content item may be transmitted to the first client device 500 by the first system 540 and/or the content system 544.

In an example, the second content item may be selected for presentation via the first interface on the first client device 500 by the content system 544. Alternatively and/or additionally, the content system 544 may transmit the second content item to the first client device 500 (for presentation via the first interface on the first client device 500) in response to selecting the second content item. Alternatively and/or additionally, the content system 544 may transmit the second content item to the first system 540 (in response to selecting the second content item, for example) and/or the first system 540 may transmit the second content item to the first client device 500 (in response to receiving the second content item from the content system 544, for example).

Figure 5E:
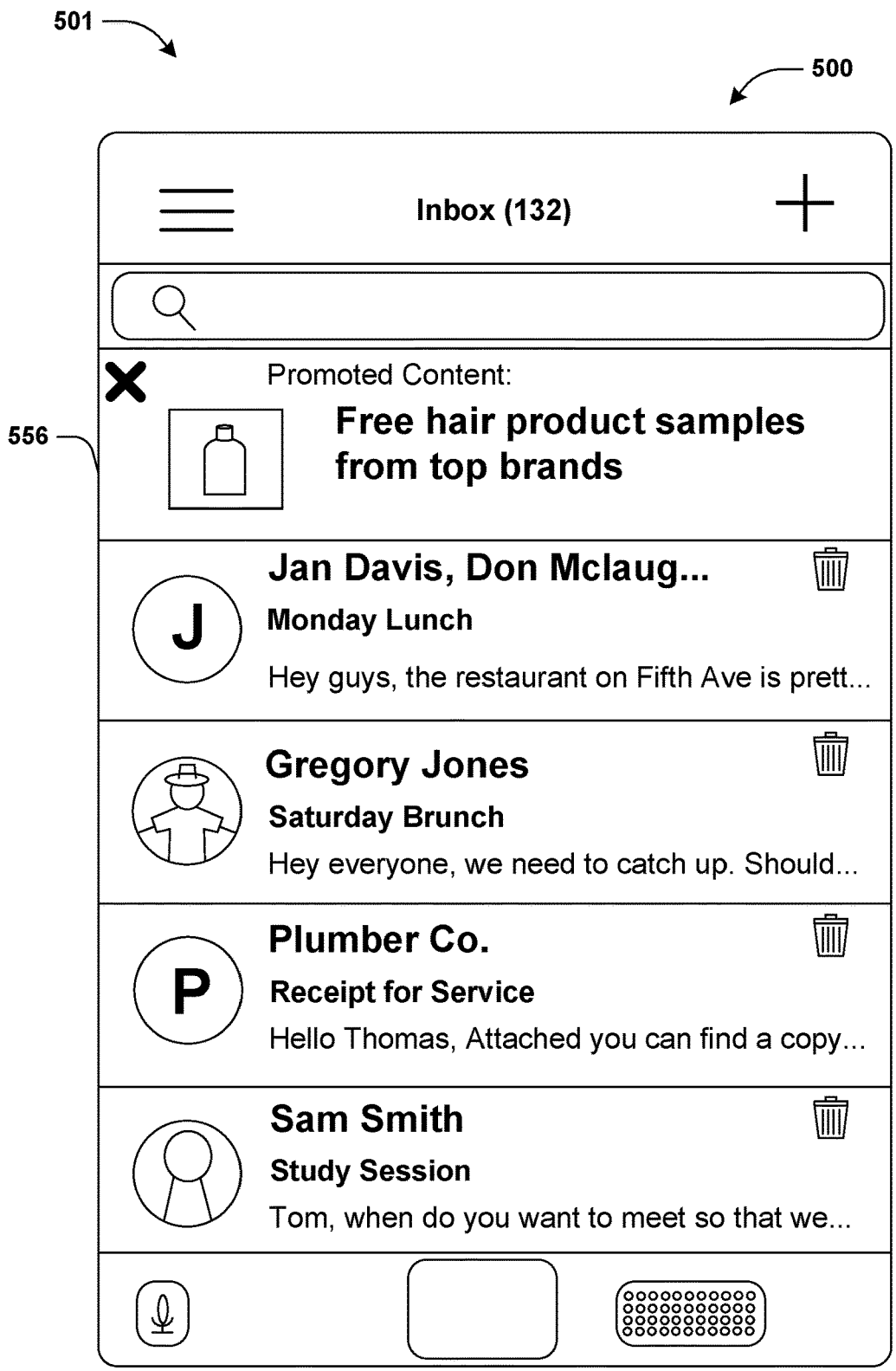
FIG. 5E is a component block diagram illustrating an example system for determining negative signal probabilities associated with content items and/or selecting content for transmission to devices, where a second content item is presented via a first interface on a first client device.

FIG. 5E illustrates the second content item (shown with reference number 556) being presented via the first interface on the first client device 500. In some examples, the second content item 556 may be displayed via the first interface using one or more native advertising techniques. For example, a format and/or a style of the second content item 556 may be visually similar to other content comprised within the first interface. In an example where the first interface corresponds to a communication interface displaying a list of messages (e.g., a list of email items, a list of instant message items, a list of message conversation items, etc.), a format and/or a style of the second content item 556 may be configured to look similar to at least one of an email item, an instant message item, a message conversation item, etc. In an example where the first interface corresponds to a news article platform displaying a list of news articles, a format and/or a style of the second content item 556 may be configured to look similar to a news article item. In an example where the first interface corresponds to a search interface displaying a list of search results, a format and/or a style of the second content item 556 may be configured to look similar to a search result.

It may be appreciated that the disclosed subject matter may assist a user (and/or a client device associated with the user) in receiving and/or consuming content that the user may have an interest in. For example, the content selected for transmission to the client device may be selected based upon a probability of receiving a negative signal associated with the content responsive to presenting the content via the client device. Accordingly, a probability that the user is not interested in the content (and/or that the user will close the content) may be reduced.

Implementation of at least some of the disclosed subject matter may lead to benefits including, but not limited to, a reduction in negative signals received from client devices, a reduction in losses incurred as a result of receiving negative signals and/or content items being closed via client devices, an increase in generalized revenue for presenting content items via client devices, etc.

Alternatively and/or additionally, implementation of at least some of the disclosed subject matter may lead to benefits including a more accurate determination of content item scores associated with content items (e.g., as a result of determining negative signal probabilities associated with receiving negative signals from client devices, determining expected losses (e.g., reduction values) associated with content items based upon negative signal probabilities and/or negative signal loss values, determining content item scores based upon the expected losses, etc.). The more accurate determination of content item scores associated with content items may also lead to a more accurate and/or appropriate selection of a content item for presentation via a client device that has a lower probability of resulting in the content item being closed and/or a negative signal being received.

Alternatively and/or additionally, implementation of at least some of the disclosed subject matter may lead to benefits including a reduction in bandwidth (e.g., as a result of reducing probabilities of receiving negative signals associated with content items being closed, such that fewer replacement content items (to be displayed in place of closed content items) are transmitted to client devices).

Alternatively and/or additionally, implementation of at least some of the disclosed subject matter may lead to benefits including a faster identification of content to be transmitted and/or faster loading of the content on a receiving device, such as a result of the first system 540 (e.g., the communication system) including the activity sequence information in the second request for content 542. For example, by including the activity sequence information (indicative of the first sequence of actions 524) in the second request for content 542 transmitted to the content system 544, the content system 544 may perform content selection with increased accuracy. For example, the increased accuracy may be a result of the content system 544 selecting a content item for transmission to the first client device 100 based upon the activity sequence information provided in the second request for content 542. Alternatively and/or additionally, by including the activity sequence information (indicative of the first sequence of actions 524) in the second request for content 542 transmitted to the content system 544, the content system 544 may have access (e.g., immediate access) to the activity sequence information (indicative of the first sequence of actions 524) when the content system 544 receives the second request for content 542. Thus, upon reception of the second request for content 542, the content system 544 may use the activity sequence information to determine one or more negative signal probabilities, one or more positive signal probabilities and/or one or more content item scores for content item selection (e.g., the content system 544 may identify and/or use the activity sequence information, for content item selection, in real time and/or without a logging latency). Alternatively and/or additionally, the activity sequence information may be used to train and/or update the first model and/or the second model. For example, the first model and/or the second model may be trained and/or updated using the activity sequence information in response to receiving the second request for content 542, and/or in response to identifying the activity sequence information indicated by the second request for content 542. Accordingly, the first model and/or the second model may be trained and/or updated based upon recent (e.g., current) information, and thus, may determine negative signal probabilities more accurately. Alternatively and/or additionally, the first model and/or the second model may be trained and/or updated using logged data (e.g., data indicating actions of users), such as data provided by a logging system that logs (e.g., records) actions of users.

In some examples, at least some of the disclosed subject matter may be implemented on a client device, and in some examples, at least some of the disclosed subject matter may be implemented on a server (e.g., hosting a service accessible via a network, such as the Internet).

Figure 6:
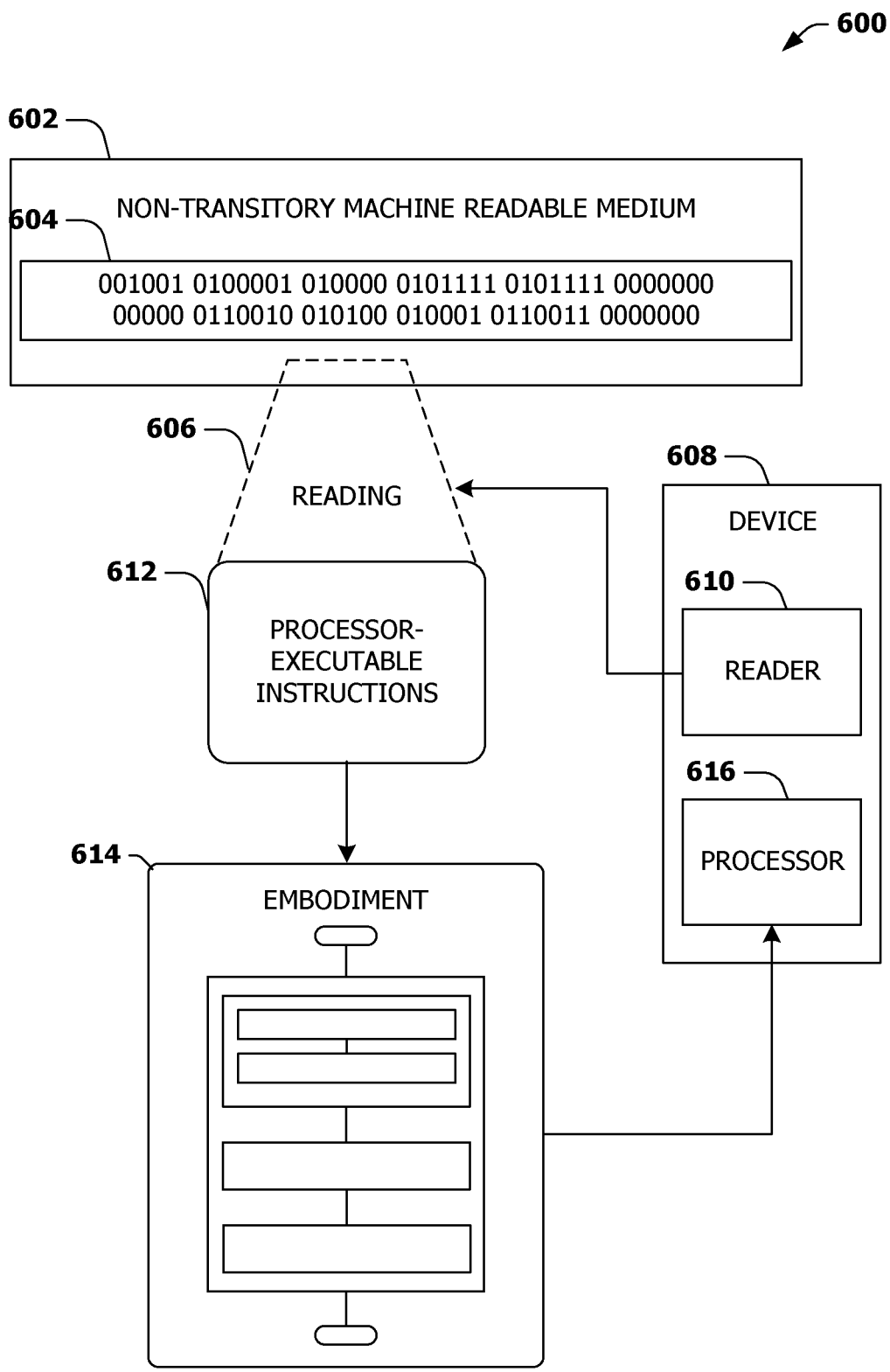
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
identifying a sequence of actions, comprising two or more interactions with one or more emails represented in an email inbox, performed using a first email interface on a first client device;
determining, based upon the sequence of actions comprising the two or more interactions with the one or more emails in the email inbox, a first negative signal probability of receiving a negative signal indicative of a first content item being closed via the first client device responsive to presenting the first content item via the first email interface on the first client device; and
controlling the first email interface on the first client device based upon the first negative signal probability.

2. The method of claim 1, comprising:
determining not to present the first content item based upon the first negative signal probability, wherein the controlling the first email interface on the first client device comprises not presenting the first content item via the first email interface on the first client device based upon the determining not to present the first content item.

3. The method of claim 2, comprising:
comparing the first negative signal probability with a threshold negative signal probability, wherein the determining not to present the first content item is based upon a determination that the first negative signal probability exceeds the threshold negative signal probability.

4. The method of claim 1, wherein:
the controlling the first email interface on the first client device is based upon a plurality of negative signal probabilities, comprising the first negative signal probability, associated with a plurality of content items comprising the first content item;
each negative signal probability of the plurality of negative signal probabilities is associated with a content item of the plurality of content items; and
the method comprises:
selecting, based upon the plurality of negative signal probabilities, the first content item from among the plurality of content items for presentation via the first client device, wherein the controlling the first email interface comprises presenting the first content item via the first email interface on the first client device based upon the selecting the first content item.

5. The method of claim 4, comprising:
determining a plurality of positive signal probabilities associated with the plurality of content items, wherein:
the plurality of positive signal probabilities comprises a first positive signal probability associated with the first content item; and
the first positive signal probability corresponds to a probability of receiving a positive signal associated with the first content item from the first client device responsive to presenting the first content item via the first email interface on the first client device; and
determining a plurality of content item scores associated with the plurality of content items based upon the plurality of negative signal probabilities and the plurality of positive signal probabilities, wherein the selecting the first content item is performed based upon the plurality of content item scores.

6. The method of claim 5, wherein:
the positive signal corresponds to an indication of at least one of:
a selection of the first content item; or
a conversion event associated with the first content item.

7. The method of claim 1, wherein:
the controlling the first email interface on the first client device based upon the first negative signal probability is performed during a first activity session of the first email interface on the first client device;
the sequence of actions is performed during the first activity session; and
the first activity session corresponds to a period of time during which a period of inactivity of the first email interface on the first client device does not exceed a threshold duration of inactivity.

8. The method of claim 7, wherein:
the first email interface on the first client device is inactive throughout a second period of time between the first activity session and a second activity session preceding the first activity session, wherein the second period of time exceeds the threshold duration of inactivity.

9. The method of claim 1, comprising:
determining user demographic information associated with the first client device, wherein the determining the first negative signal probability is performed based upon the user demographic information.

10. The method of claim 1, comprising:
presenting, via the first client device, a second content item;
receiving, from the first client device, a second negative signal associated with the second content item; and
storing an indication of the second content item in a first user profile associated with the first client device, wherein:
the first user profile is indicative of a plurality of content items associated with negative signals received from the first client device;
the second content item is included in the plurality of content items; and
the determining the first negative signal probability is performed based upon the first user profile.

11. The method of claim 1, wherein:
the first email interface comprises at least one of an email client interface or a web email interface.

12. The method of claim 1, wherein:
the controlling the first email interface on the first client device comprises presenting a second content item, in the first email interface, with at least one of a format or a style visually similar to other content comprised within the first email interface.

13. The method of claim 1, comprising:
presenting a second content item, in a second interface, with at least one of a format or a style visually similar to other content comprised within the second interface.

14. A computing device comprising:
a processor; and
memory comprising processor-executable instructions that when executed by the processor cause performance of operations, the operations comprising:
identifying a sequence of actions, comprising two or more interactions with one or more emails represented in an email inbox, performed using a first email interface on a first client device; and
transmitting, to a content system, a request to provide content for presentation via the first email interface on the first client device, wherein the request is indicative of (i) the sequence of actions comprising the two or more interactions with the one or more emails in the email inbox and (ii) user identification information associated with the first client device, wherein the content system determines, based upon the sequence of actions, a first negative signal probability of receiving a negative signal indicative of a first content item being closed via the first client device responsive to presenting the first content item via the first email interface on the first client device.

15. The computing device of claim 14, wherein:
the content system determines, based upon the sequence of actions, a plurality of negative signal probabilities associated with a plurality of content items, wherein the plurality of negative signal probabilities comprises the first negative signal probability;
the content system determines whether to present the first content item via the first email interface on the first client device based upon the plurality of negative signal probabilities.

16. The computing device of claim 14, wherein:
the transmitting the request is performed during a first activity session of the first email interface on the first client device;
the sequence of actions is performed during the first activity session; and
the first activity session corresponds to a period of time during which a period of inactivity of the first email interface on the first client device does not exceed a threshold duration of inactivity.

17. A non-transitory machine readable medium having stored thereon processor-executable instructions that when executed cause performance of operations, the operations comprising:
receiving, from a communication system controlling an email interface on a first client device, a request to provide content for presentation via the email interface on the first client device, wherein the request is indicative of a sequence of actions, comprising two or more interactions with one or more emails represented in an email inbox, performed using the email interface on the first client device;
determining, based upon the sequence of actions comprising the two or more interactions with the one or more emails in the email inbox, a plurality of negative signal probabilities associated with a plurality of content items, wherein:
a first negative signal probability of the plurality of negative signal probabilities is associated with a first content item of the plurality of content items; and
the first negative signal probability of the plurality of negative signal probabilities corresponds to a probability of receiving a negative signal indicative of the first content item being closed via the first client device responsive to presenting the first content item via the email interface on the first client device; and
determining whether to present the first content item via the email interface on the first client device based upon the plurality of negative signal probabilities.

18. The non-transitory machine readable medium of claim 17, the operations comprising:
determining, based upon the plurality of negative signal probabilities, a plurality of content item scores associated with the plurality of content items, wherein the plurality of content item scores comprises a first content item score associated with the first content item, wherein the determining whether to present the first content item via the email interface on the first client device comprises determining to present the first content item via the email interface on the first client device based upon a determination that the first content item score is higher than other content item scores of the plurality of content item scores.

19. The non-transitory machine readable medium of claim 17, the operations comprising:
comparing the first negative signal probability with a threshold negative signal probability, wherein the determining whether to present the first content item via the email interface on the first client device comprises determining not to present the first content item based upon a determination that the first negative signal probability exceeds the threshold negative signal probability.

20. The non-transitory machine readable medium of claim 17, wherein:
the determining whether to present the first content item via the email interface on the first client device comprises determining to present the first content item via the email interface on the first client device; and in response to the determination to present the first content item, transmitting the first content item to the first client device for presentation via the email interface on the first client device.

\* \* \* \* \*